United States Patent [19]
Runnels

[11] Patent Number: 5,882,025
[45] Date of Patent: Mar. 16, 1999

[54] BICYCLE WITH RHOMBUS-LIKE GEAR WITH CIRCULARLY CURVED APEXES

[76] Inventor: David J. Runnels, 2701 N. 33rd St., Orange, Tex. 77630

[21] Appl. No.: 595,132

[22] Filed: Feb. 1, 1996

Related U.S. Application Data

[63] Continuation-in-part of Ser. No. 796,363, Nov. 22, 1991.
[51] Int. Cl.⁶ .............................. F16H 55/17; B62M 9/08
[52] U.S. Cl. .............................................. 280/259; 74/437
[58] Field of Search ..................... 280/259, 260, 280/212, 249, 250; 74/594.1, 595, 437, 457, 462

[56] References Cited

U.S. PATENT DOCUMENTS

| | | | |
|---|---|---|---|
| 515,449 | 2/1894 | Scovell | 280/259 |
| 530,058 | 11/1894 | Schaum et al. | 280/259 |
| 571,086 | 11/1896 | Fulton et al. | 74/437 |
| 596,289 | 12/1897 | Smith | 280/259 |
| 650,346 | 5/1900 | Tuttle | 280/259 |
| 2,378,634 | 6/1945 | Hussey | 280/260 |
| 3,899,932 | 8/1975 | Durham | 74/437 |
| 4,260,044 | 4/1981 | Foster | 280/259 |
| 4,865,577 | 9/1989 | Freudenstein | 280/259 |

FOREIGN PATENT DOCUMENTS

| | | | |
|---|---|---|---|
| 4114649 A1 | 12/1991 | Germany | 280/259 |
| 91441 | 6/1996 | Germany | 280/260 |
| 224823 | 3/1943 | Switzerland | 280/259 |

*Primary Examiner*—Brian L. Johnson
*Assistant Examiner*—Gary Savitt
*Attorney, Agent, or Firm*—Neal J. Mosely

[57] ABSTRACT

A bicycle is disclosed with a rhombus-like (preferably 60°–120°), with circularly curved apexes, drive sprocket gear and a circular driven sprocket on the ear driven wheel. This gear arrangement varies the overall power input from the drive sprocket to the driven gear. The shape of the drive sprocket and the location of the drive pedal changes the gear ratio so that a low gear ratio is utilized during the horizontal portion of movement of the cyclist's legs and a high gear ratio is utilized during the vertical movement of the legs. The gear ratio with the rhomboidal gear is relatively constant during horizontal movement and abruptly changes at the approach to and during vertical movement of the cyclist's legs. While the rhombus-like, with circularly curved apexes, gear is shown primarily for bicycles it may be used in other systems for converting reciprocal to rotary movement with a change in gear ratio.

7 Claims, 2 Drawing Sheets

BICYCLE WITH RHOMBUS-LIKE GEAR WITH CIRCULARLY CURVED APEXES

This application is a continuation-in-part of application Ser. No. 07/796,363, filed Nov. 22, 1991.

BACKGROUND OF THE INVENTION

1. Field Of The Invention

This invention relates generally to bicycles and drive sprocket gears and more particularly to a bicycle having a drive sprocket gear of a shape providing an abrupt change in gear ratio on change in pedal movement from a horizontal direction to a vertical direction.

2. Brief Description Of The Prior Art

Bicycles with a pedal driven sprocket gear driving a gear on the rear wheel were developed in the third quarter of the 19th century. In riding a bicycle, as the rider moves the pedals through a complete rotation, there are portions of the cycle of power application which are more effective than others.

In particular, when either of the pedals is at the top of its rotation and slightly forward of center, the cyclist can easily apply a strong downward force with considerable effect in the application of torque to the drive sprocket. On the other hand, when the pedal is pointed straight down, there is little or no torque being applied to the sprocket. Thus, during the vertical part of the movement, force is applied effectively, and during the horizontal part of the movement, there is little or no force applied.

During the last century, attempts were made to improve the gear relationships by making the drive sprocket gear elliptical in shape. This allegedly gave improved performance during certain portions of the operation of the drive sprocket. The use of elliptical drive sprocket gears has been suggested from time to time up to the present date. There are several patents which disclose various types of bicycles with elliptical or oblong gears.

Metz U.S. Pat. No. 513,589 discloses a bicycle with an elliptical drive sprocket gear.

Scovell U.S. Pat. No. 515,449 discloses a bicycle with an oblong drive sprocket gear.

Schaum et al U.S. Pat. No. 530,058 discloses a bicycle with an elliptical drive sprocket gear having means to compensate for variations in tension of the drive chain.

Delacroix U.S. Pat. No. 885,082 discloses another bicycle with an elliptical drive sprocket gear and means for compensating for slack in the drive chain during operation.

Hattan U.S. Pat. No. 3,259,398 discloses another bicycle with elliptical drive sprocket and having a system of idler gears for compensating for slack in the drive chain at different positions of operation.

Durham U.S. Pat. No. 3,899,932 discloses another elliptical drive gear with a special gear tooth design for preventing derailing of the drive chain.

Moretti Italian Patent 266,781 shows a bicycle gear system consisting of a drive sprocket, a driven gear for the rear wheel and an intermediate pinion gear. The drive sprocket has the appearance that it might have flat sides with curvatures at the apexes but an English translation reveals that continuous curves are all that is disclosed, e g., ovoid, helicoid, oval, etc., none of which have flat surfaces.

Frisiani Italian Patent 974,415 shows a bicycle gear system consisting of a drive sprocket, a driven gear for the rear wheel and an intermediate pinion gear. The drive sprocket is clearly elliptical and has no flat sides.

The present invention is distinguished over the prior art in that there is no previous disclosure of the use of drive sprocket gears having distinct rectilinear flat sections connected by circular sections which provide for an abrupt change in gear ratio at desired points in the movement of the sprocket gear. This invention is distinguished from the prior art in providing a bicycle having a rhomboidal (rhombus-like with circularly curved apexes) drive sprocket gear and a circular driven sprocket on the rear driven wheel. This gear arrangement varies the overall power input from the drive sprocket to the driven gear. The shape of the drive sprocket and the location of the drive pedal changes the gear ratio so that a low gear ratio is utilized during the horizontal portion of movement of the cyclist's legs and a high gear ratio is utilized during the vertical movement of the legs. The gear ratio with the rhomboidal (rhombus-like with circularly curved apexes) gear is constant during the horizontal part of the movement and abruptly changes at the approach to and during the vertical part of the movement of the cyclist's legs. While the rhomboidal (rhombus-like with circularly curved apexes) gear is shown primarily for bicycles it may be used in other systems for converting reciprocal to rotary movement with a change in gear ratio.

SUMMARY OF THE INVENTION

It is therefore an object of the present invention to provide a new and improved bicycle with a drive sprocket gear of improved design and construction.

It is another object of this invention is to provide a new and improved bicycle with a drive sprocket gear of improved design and construction wherein the gear ratio is changed during rotation of the sprocket.

Another object of this invention is to provide a new and improved bicycle with a drive sprocket gear of improved design and construction driving a conventional circular gear on the rear driven wheel.

Another object of this invention is to provide a new and improved bicycle with a drive sprocket gear having rectilinear sections connected by circular sections whereby the gear ratio is relatively constant during horizontal movement and abruptly changes at the approach to and during vertical movement of the cyclist's legs.

Still another object of this invention is to provide a new and improved bicycle with a drive sprocket gear having rectilinear sections connected by circular sections whereby the gear ratio abruptly changes at the approach to and during vertical movement of the cyclist's legs.

Still another object of this invention is to provide a new and improved bicycle with a drive sprocket gear of rhomboidal (rhombus-like with circularly curved apexes) design and construction.

A further object of this invention is to provide a new and improved bicycle with a drive sprocket gear of rhomboidal (rhombus-like with circularly curved apexes) design and construction driving a conventional circular gear on the rear driven wheel.

A further object of this invention is to provide a new and improved bicycle with a rhomboidal (rhombus-like with circularly curved apexes) drive sprocket gear having rectilinear sections connected by circular sections whereby the gear ratio is relatively constant during horizontal movement and abruptly changes at the approach to and during vertical movement of the cyclist's legs.

Other objects of the invention will become apparent from time to time throughout the specification and claims as hereinafter related.

The above noted objects and other objects of the invention are accomplished by a novel bicycle having a rhomboidal (rhombus-like with circularly curved apexes) drive sprocket gear having rectilinear sections connected by curved sections and a circular driven sprocket on the rear driven wheel. This gear arrangement varies the overall power input from the drive sprocket to the driven gear. The shape of the drive sprocket and the location of the drive pedal changes the gear ratio so that a low gear ratio is utilized during the horizontal portion of movement of the cyclist's legs and a high gear ratio is utilized during the vertical movement of the legs. The gear ratio with the rhomboidal, with circularly curved apexes, gear is relatively constant during horizontal movement and abruptly changes at the approach to and during vertical movement of the cyclist's legs. While the rhomboidal (rhombus-like with circularly curved apexes) gear is shown primarily for bicycles it may be used in other systems for converting reciprocal to rotary movement with a change in gear ratio.

DESCRIPTION OF THE PREFERRED EMBODIMENT

Figure 1:
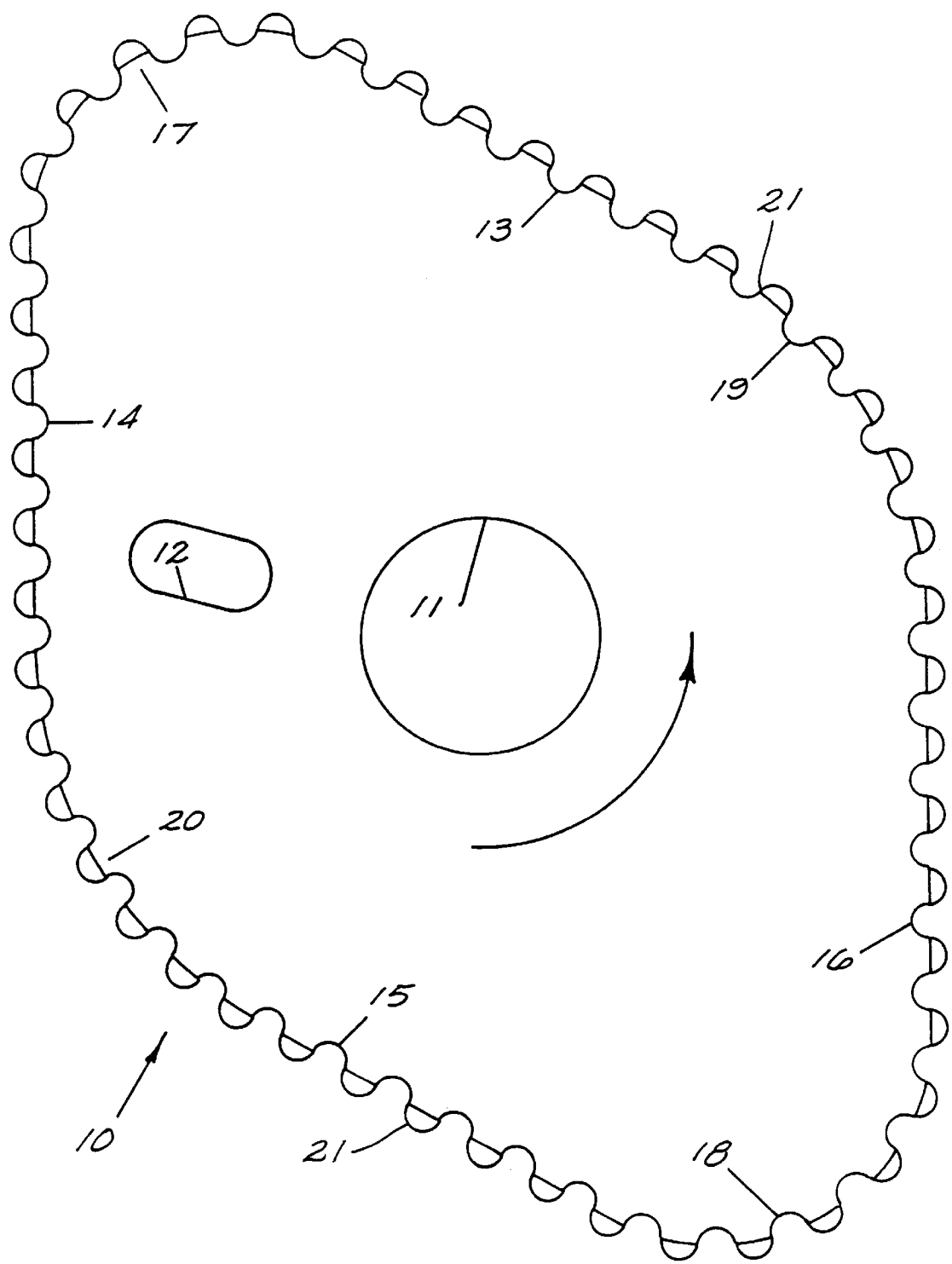
FIG. 1 is a plan view of a rhomboidal (rhombus-like with circularly curved apexes) drive sprocket gear having rectilinear sections connected by curved sections.

Referring to the drawings by numerals of reference, and more particularly to FIG. 1, there is shown a sprocket gear 10 for a bicycle which has a central opening 11 and a radial slotted opening 12 for connection to an axle, crank arm and pedal. Sprocket gear 10 is rhomboidal (rhombus-like with circularly curved apexes) in shape, preferably having 60° angles at the acute angled ends and 120° angles at the obtuse angled sides, also called a 60°–120° rhomboid, of rigid sheet metal or equivalent, e.g., sheet plastic, etc., having flat side portions 13, 14, 15 and 16. Curved portion 17 connects side portions 13 and 14. Curved portion 18 connects side portions 15 and 16. Curved portion 19 connects side portions 13 and 16. Curved portion 20 connects side portions 14 and 15.

A plurality of equally spaced teeth 21 extend around the entire periphery of the gear 10. The teeth on the rear, driven gear 32 are equally spaced and have the same spacing as gear 10. The gear 10 has a major axis extending from the center of the curved portion 17 to the center of the curved portion 18. The gear 10 has a minor axis extending from the center of the curved portion 19 to the center of the curved portion 20.

Figure 2:
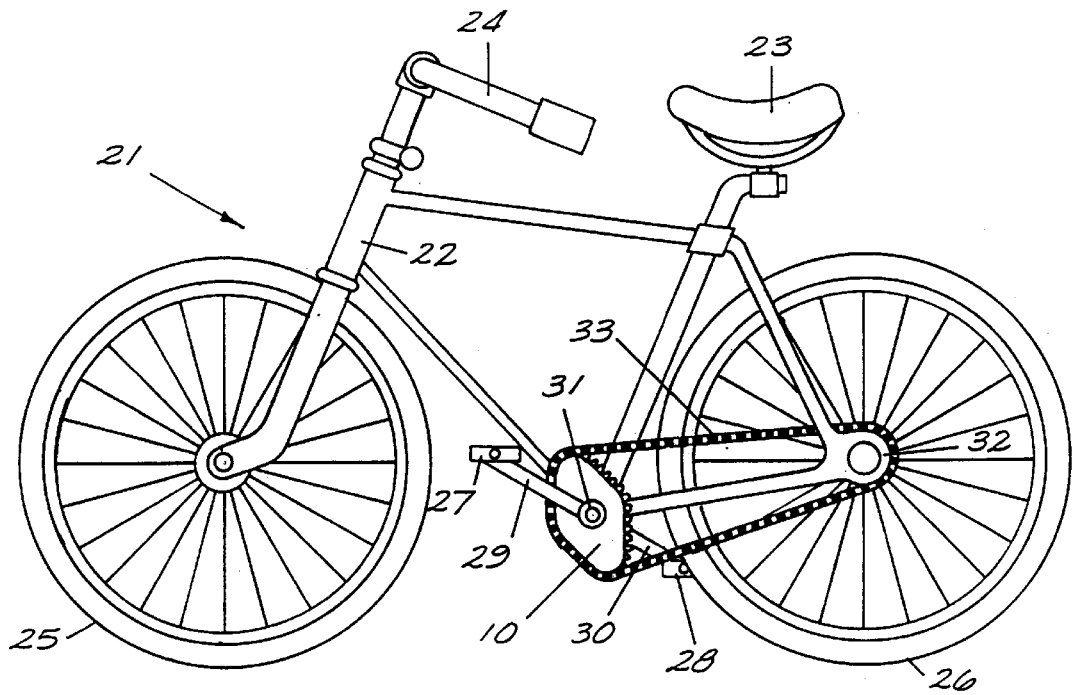
FIG. 2 is a side elevation of a bicycle having the rhomboidal (rhombus-like with circularly curved apexes) gear of FIG. 1 driving a circular rear sprocket gear, with the gear and pedals shown at the point of maximum gear ratio as the pedals are moved downward.
Figure 3:
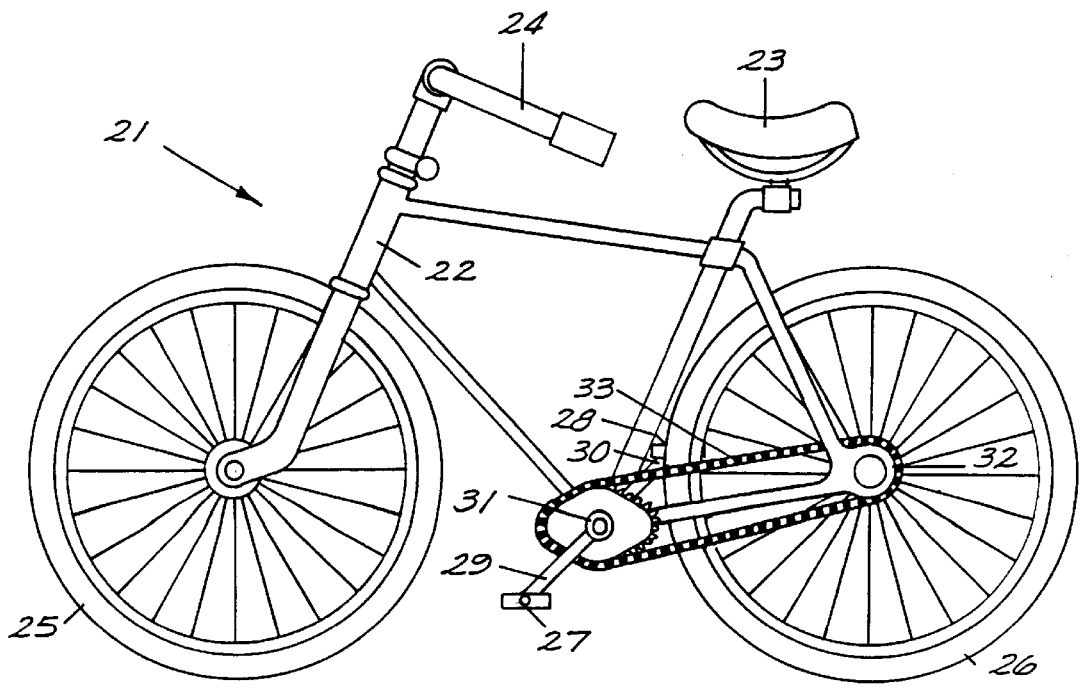
FIG. 3 is a side elevation of a bicycle having the rhomboidal (rhombus-like with circularly curved apexes) gear of FIG. 1 driving a circular rear sprocket gear, with the gear and pedals shown at the point of minimum gear ratio as the pedals are moved horizontally.

In FIGS. 2 and 3, the rhomboidal (rhombus-like with circularly curved apexes) sprocket gear 10 is shown in use on a bicycle 21 in different stages of operation. The bicycle 21 has the usual frame 22, seat 23 and handle bars 24. Frame 22 is supported on a front wheel 25 and rear wheel 26 for movement along the ground. A conventional circular rear sprocket gear 32 drives the rear wheel 26. A conventional gear chain 33 interconnects the driving sprocket gear 10 and driven sprocket gear 32.

A pair of pedals 27 and 28 are supported on crank arms 29 and 30 journaled at 31 on frame 22. Rhomboidal (rhombus-like with circularly curved apexes) sprocket gear 10 is secured to and operated by crank arms 29 and 30 and journaled at 31 for rotation on frame 22. Crank arms 29 and 30 are secured to rhomboidal sprocket gear 10 in central opening 11 and slotted opening 12 about 45° ahead of the major axis of the sprocket.

The rhomboidal (rhombus-like with circularly curved apexes) construction of sprocket gear 10 and the location of pedals 27 and 28 and crank arms 29 and 30 relative to the sprocket gear result in the application of force by the cyclist being greatest when the major axis of the sprocket is at the top of its stroke and least when the minor axis is at the top. This has the effect of allowing the cyclist to apply the greatest amount of force at the highest gear ration and the least amount of force at the lowest gear ratio. There are two distinctly different gear ratios, a high gear ratio between the sprocket teeth at the major axis and the rear driven gear, and a low gear ratio between the sprocket teeth at the minor axis and the rear driven gear. The change in gear ratios is abrupt and not a continuous change as in the case on an oblong or elliptical sprocket gear.

OPERATION

While the operation of this invention should be obvious from the foregoing description, it will be restated for clarity and for a better understanding of the advantages of the rhomboidal (rhombus-like with circularly curved apexes) sprocket gear.

In order to understand the advantages of sprocket gear 10 better, one should consider the way in which an ordinary circular sprocket gear works on a bicycle. The power requirement from a circular sprocket gear remains the same for all quadrants of the circular motion of the driving pedals when maintaining a constant speed on the bicycle. The best source of power comes in the up and down strokes of the cyclist's legs in the same manner as the reciprocal movement of the piston on a motor or engine. The forward and backward movement of the legs is not very productive of power.

In the rhomboidal (rhombus-like with circularly curved apexes) sprocket gear 10 of this invention, there is a marked decrease in the power requirements in the forward and rearward movement of the legs because the diameter of the sprocket becomes smaller as the pedals come circular from the downward movement to horizontal movement. Conversely, there is a marked increase in requirements at the top of the stroke as the pedals come circular from application of horizontal force to application of vertical force, which is at that time in the cycle where the maximum force is available.

By placing the pedals 27 and 28 and crank arms 29 and 30 ahead of the major axis (preferably 45° ahead) it becomes possible to shift application of downward force to the point where the maximum moment arm exerts the most circular force, i.e. torque. The location of the pedals 45° ahead of the major axis of the sprocket gear 10 produces a great improvement of power produced by the cyclist, although it is not yet known where the optimum location of the pedals should be.

It should also be noted that the velocity of the drive chain varies considerably as it passes over the teeth of the rhomboidal (rhombus-like with circularly curved apexes) sprocket gear 10. This results in a desired repetitive loading and unloading of the driving force. With this sprocket gear, there is no change in gear ratio when the flat sides of the sprocket are moving the drive chain, while the gear ratio increases abruptly when force is being transmitted from the major axis of the sprocket gear and decreases abruptly when the force is being transmitted from the minor axis of the sprocket gear. For the same number of teeth as a circular sprocket, there is a net result of lower overall power input requirements for the same speed and distance traveled.

The rhomboidal (rhombus-like with circularly curved apexes) sprocket gear 10 operates with the low gear ratio (ratio of minor axis of sprocket gear to rear driven gear) when the legs are moving backward and forward and with the high gear ratio (ratio of major axis of sprocket gear to rear driven gear) when the legs are moving up and down. The change between the low gear ratio and the high gear ratio is abrupt as distinguished from oblong or elliptical gears where the gear ratios are constantly changing. The teeth on the flat sides of the rhomboidal (rhombus-like with circularly curved apexes) sprocket gear are not load transmitting teeth and could be eliminated if desired.

The shape of the sprocket gear 10 requires special definition inasmuch as the shape has no known name. It is roughly a rhomb or rhombus (defined as a parallelogram having equal side and equal opposite angles (none of which are right angles) having circularly curved apexes as defined above. It has been called a rhomboid or rhomboidal above, which term has several meanings. Webster's Third New International Dictionary (the largest unabridged dictionary published in the U.S.A) defines "rhomboid" as "shaped somewhat like a rhombus", and "rhomboidal" as "shaped somewhat like a rhomboid", although there is a more specialized definition of rhomboid which is "a parallelogram in which adjacent sides are unequal and the angles are oblique". The shape of the sprocket gear therefore could be called "rhomboidal" within the scope of the dictionary definition "rhombus-like" but is referred to in the claims as a rhombus with circularly curved apexes.

While this invention has been shown fully and completely with special emphasis on certain preferred embodiments, it should be understood that within the scope of the appended claims the invention may be practiced otherwise than as specifically described herein.

I claim:

1. A bicycle comprising a frame, a seat, and handlebars, a rear wheel supported on said frame, a front wheel supported on said frame and controlled by said handlebars, a driven gear with gear teeth supported on said frame for rotation with and driving said rear wheel, a sprocket gear with gear teeth supported for rotation on said frame, crank arms and pedals supported thereby, supported on said frame for rotary motion and secured to said sprocket gear for rotating it by pedal operated motion, a drive chain surrounding said sprocket gear and said driven gear and interconnecting said sprocket gear teeth and said driven gear teeth for transferring motion and force therebetween, wherein said sprocket gear is constructed of rigid sheet material, is a rhombus shape having flat sides, with a major and minor axis, and four regions of circular curvature spaced 90° apart at the major and minor axes connecting said flat sides, said pedals being secured on said sprocket gear at an acute angle to and forward of said major axis relative to said bicycle frame, to provide a constant low gear ratio when the cyclist's legs are moving the pedals backward and forward, and a constant high gear ratio when the cyclist's legs are moving the pedals up and down, and the gear ratio changes abruptly from said constant low gear ratio to said constant high gear ratio and from said constant high gear ratio to said constant low gear ratio only at regions spaced apart 90° in the rotation of the sprocket gear.

2. A bicycle according to claim 1 in which said sprocket gear is a 60°–120° rhombus with a region of circular curvature at each of its apexes.

3. A bicycle according to claim 1 in which there is essentially no change in gear ratio when said flat sides are driving said drive chain and there is an abrupt change in gear ratio to a low ratio and to a high gear ratio during the rotation of the pedals of the bicycle.

4. A bicycle according to claim 3 in which said sprocket gear teeth and said rear gear teeth are uniformly sized and spaced to fit the drive chain, whereby there is essentially no change in gear ratio when said flat portions are driving said drive chain and there is an abrupt change in gear ratio to a low ratio and to a high gear ratio during the rotation of the pedals of the bicycle.

5. A sprocket gear constructed of rigid sheet material and having gear teeth equally spaced thereon in which said sprocket gear is a rhombus shape, with a major and minor axis, and having four regions of circular curvature spaced 90° apart at the major and minor axes, and anchoring holes for securing pedals thereon at an acute angle to said major axis, having a high gear ratio in one position and a low gear ratio in another position where the gear ratio changes in use abruptly from a low gear ratio to a high gear ratio and from a high gear ratio to a low gear ratio.

6. A sprocket gear according to claim 5 in which said sheet material has flat portions spaced around its periphery and circularly curved portions spaced 90° apart connecting said flat portions whereby there is essentially no change in gear ratio in one position when said flat portions are engaging a drive chain and there is an abrupt change in gear ratio to a low gear ratio and to a high gear ratio during the rotation of said sprocket gear.

7. A sprocket gear according to claim 5 in which said sprocket gear is in the shape of a 60°–120° rhombus having circularly curved portions at the apexes thereof and with equally spaced teeth therearound.

\* \* \* \* \*